(12) United States Patent
Shimazaki et al.

(10) Patent No.: US 8,419,066 B2
(45) Date of Patent: Apr. 16, 2013

(54) SEAT BELT DEVICE

(75) Inventors: Sadayuki Shimazaki, Tokyo (JP); Itsuo Tabayashi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/139,725

(22) PCT Filed: Dec. 15, 2009

(86) PCT No.: PCT/JP2009/070882
§ 371 (c)(1),
(2), (4) Date: Aug. 2, 2011

(87) PCT Pub. No.: WO2010/073937
PCT Pub. Date: Jul. 1, 2010

(65) Prior Publication Data
US 2011/0278906 A1 Nov. 17, 2011

(30) Foreign Application Priority Data
Dec. 22, 2008 (JP) ................................. 2008-325852

(51) Int. Cl.
*B60R 22/12* (2006.01)
*D03D 1/00* (2006.01)
(52) U.S. Cl.
USPC ........................................ 280/801.1; 297/468
(58) Field of Classification Search .................. 280/807; 242/374, 390.8; 297/474, 475, 477; 508/100, 508/108, 364, 369, 423
See application file for complete search history.

(56) References Cited

U.S. PATENT DOCUMENTS

| 4,605,571 | A | * | 8/1986 | Watanabe et al. | ............. 427/387 |
| 4,800,117 | A | * | 1/1989 | Marshall | ........................ 442/187 |
| 5,241,042 | A | * | 8/1993 | Petrea et al. | .................. 252/8.81 |
| 5,436,065 | A | * | 7/1995 | Fukamoto et al. | ............. 442/220 |
| 5,939,138 | A | | 8/1999 | Nagahara et al. | |
| 6,737,819 | B2 | * | 5/2004 | Tanji | .................................. 318/3 |
| 7,374,206 | B2 | * | 5/2008 | Nomura | ........................ 280/807 |
| 8,124,684 | B2 | * | 2/2012 | Spaan et al. | .................. 524/507 |

(Continued)

FOREIGN PATENT DOCUMENTS

EP 0 881 322 A1 12/1998
JP 61-221207 10/1986

(Continued)

OTHER PUBLICATIONS

Viscosity Converting Chart, available at http://www.engineeringtoolbox.com/viscosity-converter-d_413.html.*

(Continued)

*Primary Examiner* — Joseph Rocca
(74) *Attorney, Agent, or Firm* — Foley & Lardner LLP

(57) ABSTRACT

[Object] To provide a seat belt device which exhibits good smoothness even at a low temperature of about −30° C., which exhibits a small reduction in smoothness even after repeated use for a long period of time, or after use at a high temperature (80° C.), and which has good webbing retracting performance. [Solution] A seat belt device includes a webbing 12 formed by applying a webbing treatment agent to a webbing base material, a retractor 11 for retracting the webbing 12, and an anchor member 13 through which the webbing 12 is slidably hung. The webbing treatment agent is characterized by containing as an essential component a hydrocarbon-based synthetic oil with a viscosity of 35 to 100,000 mPa·s at −30° C.

10 Claims, 13 Drawing Sheets

2/2 DERIVATIVE TWILL WEAVE

U.S. PATENT DOCUMENTS

| | | | |
|---|---|---|---|
| 2002/0130545 A1* | 9/2002 | Tanji | 297/480 |
| 2006/0113418 A1* | 6/2006 | Nomura | 242/374 |
| 2010/0164273 A1* | 7/2010 | Spaan et al. | 297/468 |

FOREIGN PATENT DOCUMENTS

| | | | |
|---|---|---|---|
| JP | 01-163136 | | 6/1989 |
| JP | 02-175966 | | 7/1990 |
| JP | 04-066948 | | 10/1992 |
| JP | 10-037078 | | 2/1998 |
| JP | 10-037079 | | 2/1998 |
| JP | 10-088484 | | 4/1998 |
| JP | 10-140479 | | 5/1998 |
| JP | 2000-135966 | | 5/2000 |
| JP | 2001-191897 | | 7/2001 |
| JP | 2001-225717 | * | 8/2001 |
| JP | 2001-294121 | | 10/2001 |
| JP | 2002-362303 | | 12/2002 |
| JP | 3391132 | | 1/2003 |
| JP | 2008-254727 | | 10/2008 |
| JP | 2010-163734 | | 7/2010 |
| WO | WO-98/03723 | | 1/1998 |
| WO | WO 2005/075559 A1 | | 4/2005 |
| WO | WO 2009/000320 A1 | * | 12/2008 |

OTHER PUBLICATIONS

International Search Report in PCT/JP2009/070882 dated Apr. 6, 2010.

Supplementary European Search Report EP 09 83 4740 dated Nov. 7, 2012.

* cited by examiner

Fig. 9 WEAVE DIAGRAM

2/2 REGULAR TWILL WEAVE

REGULAR WEAVE

2/2 DERIVATIVE TWILL WEAVE

SEAT BELT DEVICE

TECHNICAL FIELD

The present invention relates to a seat belt device for restraining an occupant in a rapidly moving vehicle, such as an automobile.

BACKGROUND ART

An automobile seat belt device has a structure such that a webbing withdrawn from a retractor and hung through an anchor member can restrain an occupant. As the anchor member, a member referred to as a shoulder anchor, through anchor, through ring, or the like, which is fixed to a B pillar or the like, is used in many cases.

PTL 1 describes that a small roller is provided on an anchor member in order to facilitate withdrawal and retraction of the webbing. However, an adequate effect is not necessarily obtained.

Furthermore, it has been a conventional practice to improve webbing withdrawing and retracting performance by reducing friction between a webbing and an anchor member. As the treatment agent therefor, there have been proposed a coating treatment agent containing a blocked urethane prepolymer compound (PTL 2), a polyether-polyester compound-based treatment agent (for example, PTL 3), a treatment agent containing as a major component a composition including a branched alcohol ester of a higher fatty acid and a nonionic surfactant (PTL 4), and the like.

CITATION LIST

Patent Literature

PTL 1: Japanese Unexamined Patent Application Publication No. 2000-135966
PTL 2: Japanese Examined Patent Application Publication No. 4-66948
PTL 3: Japanese Unexamined Patent Application Publication No. 10-88484
PTL 4: Japanese Unexamined Patent Application Publication No. 2-175966

SUMMARY OF INVENTION

Technical Problem

However, regarding the treatment agent of PTL 2, the resin falls off after use of the seat belt for a long period of time, and the smoothness and storability of the belt after use for a long period of time tend to be degraded. Regarding the treatment agent of PTL 3, the resin does not fall off, and smoothness and abrasion resistance at normal temperature are at least satisfactory. However, smoothness cannot be maintained in an extremely cold region where the winter temperature is about −30° C., which is a problem. Furthermore, the treatment agent of PTL 4 is not satisfactory in terms of smoothness and abrasion resistance.

It is an object of the present invention to solve the problems associated with the conventional techniques and to provide a seat belt device which exhibits good smoothness even at a low temperature of about −30° C., which exhibits a small reduction in smoothness even after repeated use for a long period of time, or after use at a high temperature (80° C.), and which has good webbing retracting performance.

Solution to Problem

According to a first embodiment, a seat belt device includes a webbing formed by applying a webbing treatment agent to a webbing base material, a retractor for retracting the webbing, and an anchor member through which the webbing is slidably hung. The webbing treatment agent is characterized by containing as an essential component a hydrocarbon-based synthetic oil with a viscosity of 35 to 100,000 mPa·s at −30° C.

According to a second embodiment, a seat belt device according to the first embodiment is characterized in that the hydrocarbon-based synthetic oil comprises a poly-α-olefin containing as an essential constitutional unit an α-olefin having 3 to 24 carbon atoms and/or an ethylene/α-olefin copolymer containing as essential constitutional units ethylene and an α-olefin having 3 to 24 carbon atoms.

According to a third embodiment, a seat belt device according to the first or second embodiment is characterized in that the webbing treatment agent further contains a silicone oil with a viscosity of 35 to 45,000 mPa·s at −30° C., and the weight ratio of the hydrocarbon-based synthetic oil/the silicone oil is 95/5 to 50/50.

According to a fourth embodiment, a seat belt device according to the third embodiment is characterized in that the silicone oil comprises at least one of polydimethylsiloxane and an amino-modified silicone.

According to a fifth embodiment, a seat belt device according to any one of the first to fourth embodiments is characterized in that the webbing treatment agent further contains a nonionic surfactant, and the weight ratio of the hydrocarbon-based synthetic oil/the nonionic surfactant is 99/1 to 30/70.

According to a sixth embodiment, a seat belt device according to the fifth embodiment is characterized in that the nonionic surfactant comprises a polyhydric alcohol fatty acid ester and/or an alkylene oxide adduct of a polyhydric alcohol fatty acid ester.

According to a seventh embodiment, a seat belt device according to any one of the first to sixth embodiments is characterized in that the webbing base material is made of a 2/2 derivative twill woven fabric of synthetic fibers.

According to an eighth embodiment, a seat belt device according to any one of the first to sixth embodiments is characterized in that the webbing base material is made of a regular woven fabric or broken twill woven fabric of synthetic fibers.

According to a ninth embodiment, a seat belt device according to the first to eighth embodiments is characterized in that, when a test is carried out at +20° C. and −30° C., in which the webbing is hung over a horizontal test bar, which is described below, so that both ends of the webbing are suspended vertically downward, an equal load is applied to the both ends, then the load on one of the ends is increased, and the amount of load W at which the webbing starts to move is measured, $W_{20}/W_{-30}$ is 0.75 or more, where $W_{20}$ is the load W at +20° C., and $W_{-30}$ is the load W at −30° C.

Test Bar
Diameter: 15 to 25 mm
Material: chromium-plated steel
Surface roughness: 7 to 17 μm

Advantageous Effects of Invention

In the seat belt device of the present invention, even in an extremely cold region at −30° C., even after repeated use for a long period of time, or even after use at a high temperature (80° C.), a retraction force close to that at normal temperature is propagated to the front end portion of the webbing located in front of the anchor member, and the webbing is retracted easily and quickly.

Since the seat belt webbing according to the present invention has excellent smoothness, abrasion resistance, and heat resistance at normal temperature and a low temperature (−30° C.), excellent smoothness is exhibited even in an extremely cold region where the winter temperature is about −30° C., and the storability of the seat belt in the retracting device is not degraded even after repeated use for a long period of time or even after use at high temperature. Thus, good usability can be maintained.

Furthermore, in the webbing to which the webbing treatment agent specified in any of the second to sixth embodiments is applied, the reduction in smoothness is small even after use for a long period of time, and good abrasion resistance is exhibited. In particular, in the case where a webbing base material made of a 2/2 derivative twill woven fabric is used, excellent advantageous effects can be obtained.

DESCRIPTION OF EMBODIMENTS

The present invention will be described more in detail below.

Figure 1:
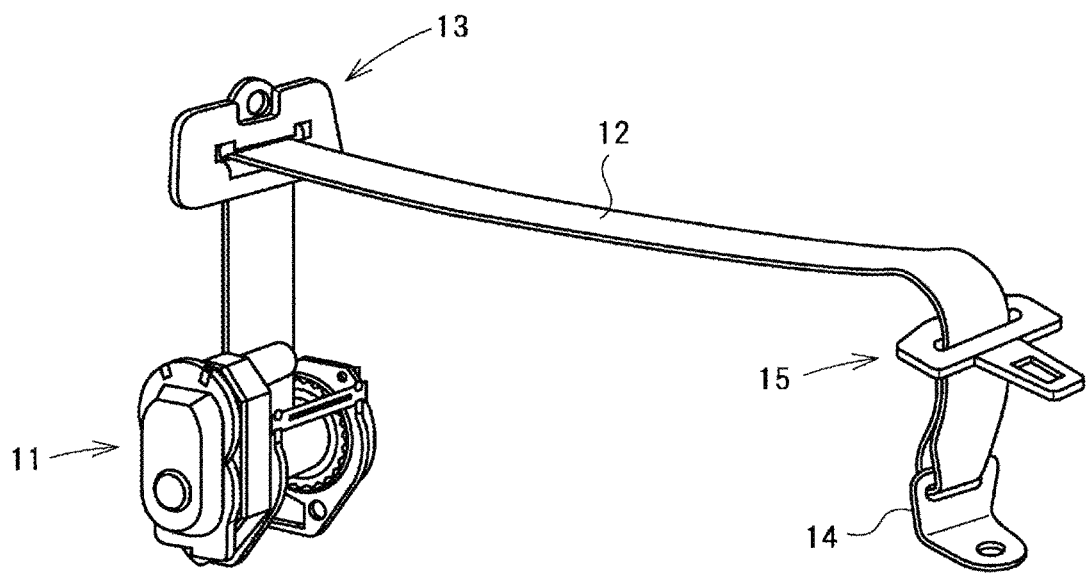
FIG. 1 is a schematic view of a seat belt device.

FIG. 1 is a perspective view of a seat belt device according to an embodiment of the present invention. The seat belt device includes a retractor 11, a webbing 12, the base end portion of which is retracted by the retractor 11, a shoulder anchor 13 which is an anchor member and through which the webbing 12 is hung, an anchor 14 for joining the front end of the webbing 12 to the automobile body member, a tongue 15 through which the front end portion of the webbing is passed, and the like.

Figure 2:
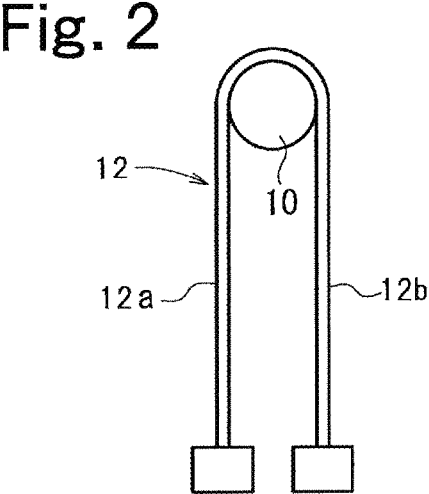
FIG. 2 is a view illustrating a method of measuring a webbing retracting force.

In the present invention, as shown in FIG. 2, when a test is carried out at +20° C. and −30° C., in which a webbing 12 is hung over a horizontal test bar 10 so that both ends 12*a* and 12*b* of the webbing 12 are suspended vertically downward, an equal load (about 110 g assuming the spring retraction force) is applied to the ends 12*a* and 12*b*, then the load on one of the ends (e.g., the end 12*a*) is increased, and the amount of load W at which the webbing starts to move is measured, $W_{20}/W_{-30}$ is 0.75 or more, preferably 0.75 to 0.95, and particularly preferably 0.75 to 1.00, where $W_{20}$ is the load W at +20° C., and $W_{-30}$ is the load W at −30° C. In addition, the load W at +80° C. is denoted by $W_{80}$. The test bar 10 is composed of a chromium-plated steel bar having a diameter of 15 to 25 mm and a surface roughness of 7 to 17 μm.

In this seat belt device, since the sliding resistance between the webbing 12 and the anchor 14 is small even at extremely low temperature, the retracting force is propagated to the tongue side in the same manner as that at normal temperature (20° C.) even in an extremely cold region, and thus the webbing retracting performance is satisfactory.

According to a preferred embodiment of the present invention, the webbing is formed by applying a webbing treatment agent to a webbing base material made of a woven fabric of polyester fibers.

Polyester yarns of 500 to 3,000 d (denier), in particular, about 1,000 to 1,500 d, are suitably used for the woven fabric.

Figure 3:
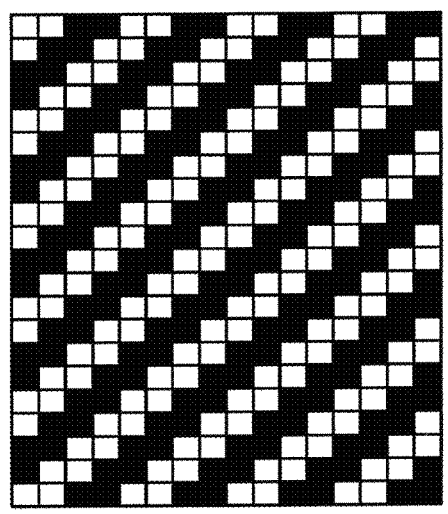
FIG. 3 is a weave diagram of a regular weave.
Figure 4:
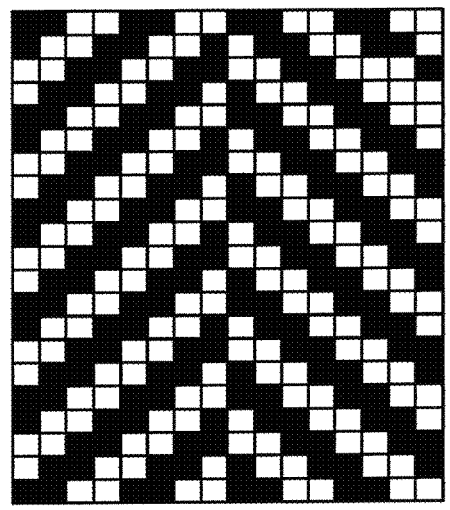
FIG. 4 is a weave diagram of a 2/2 derivative twill weave.
Figure 5:
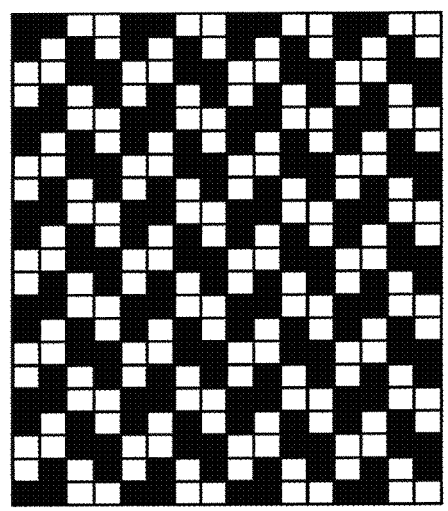
FIG. 5 is a weave diagram of a broken twill weave.

The weave of the woven fabric is preferably a 2/2 derivative twill weave shown in FIG. 4, but may be a regular weave shown in FIG. 3, a broken twill weave shown in FIG. 5, or the like. The woven fabric weave will be described with reference to FIGS. 6 to 9.

Figure 6:
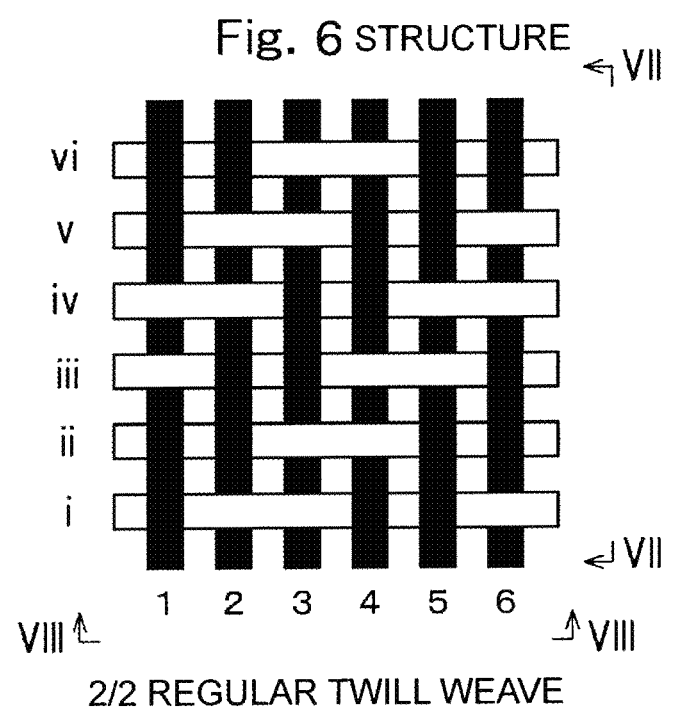
FIG. 6 is a schematic plan view showing the interlacing of warp yarns with weft yarns.
Figure 7:
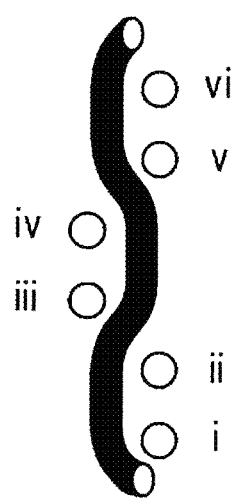
FIG. 7 is a view along arrow VII-VII in FIG. 6.
Figure 8:
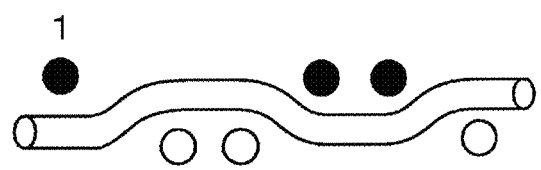
FIG. 8 is a view along arrow VIII-VIII in FIG. 6.
Figure 9:
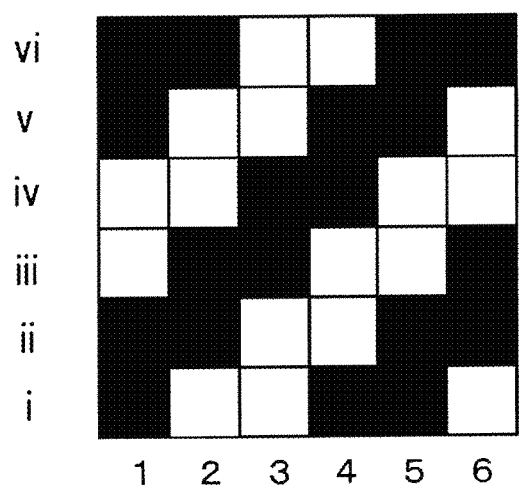
FIG. 9 is a weave diagram of the fabric shown in FIG. 6.

FIG. 6 is a schematic plan view showing a state in which warp yarns and weft yarns are interlaced with each other in a regular weave. FIG. 7 is a view along arrow VII-VII in FIG. 6. FIG. 8 is a view along arrow VIII-VIII in FIG. 6. FIG. 9 is a weave diagram of the fabric shown in FIG. 6. In the regular twill weave, warp yarns 1 and 5 go over weft yarns i and ii, go under weft yarns iii and vi, and go over weft yarns v and vi. In such a manner, ups and downs are repeated.

The interlacing positions shift one by one from the warp yarn 1 to the warp yarn 6.

Figure 10:
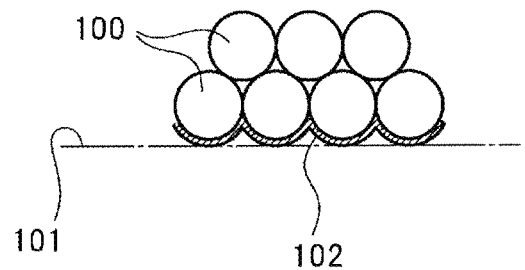
FIG. 10 is a schematic cross-sectional view of a regular weave.
Figure 11:
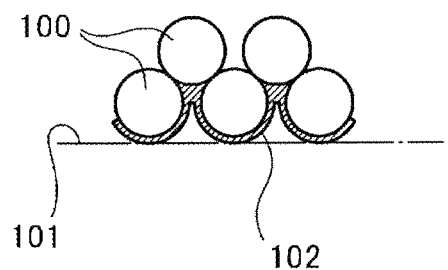
FIG. 11 is a schematic cross-sectional view of a 2/2 derivative twill weave.
Figure 12:
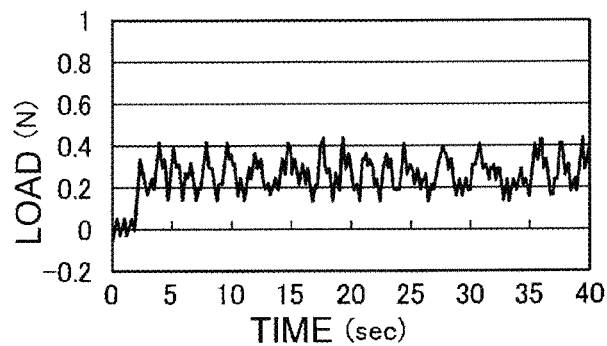
FIG. 12 is a graph showing the results of a friction test.
Figure 13:
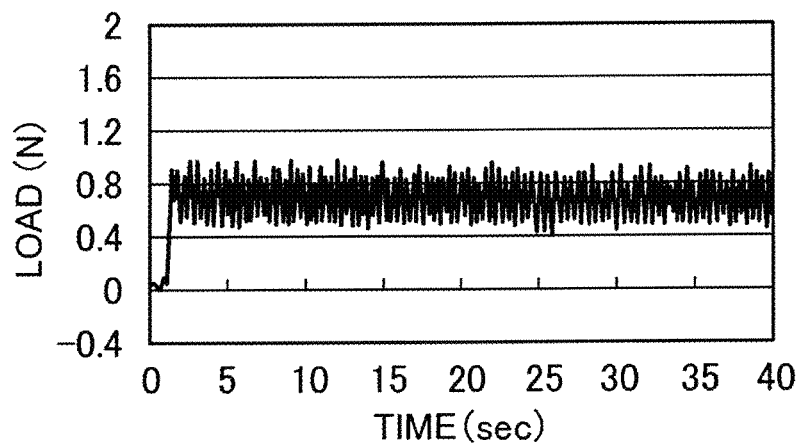
FIG. 13 is a graph showing the results of a friction test.
Figure 14:
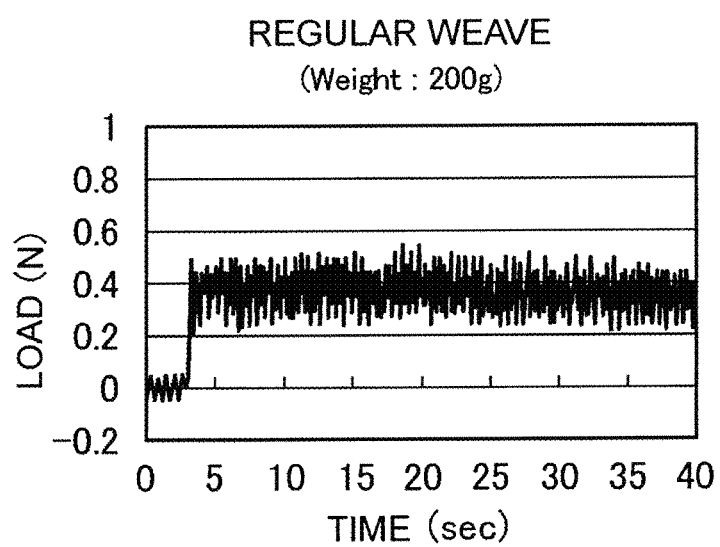
FIG. 14 is a graph showing the results of a friction test.
Figure 15:
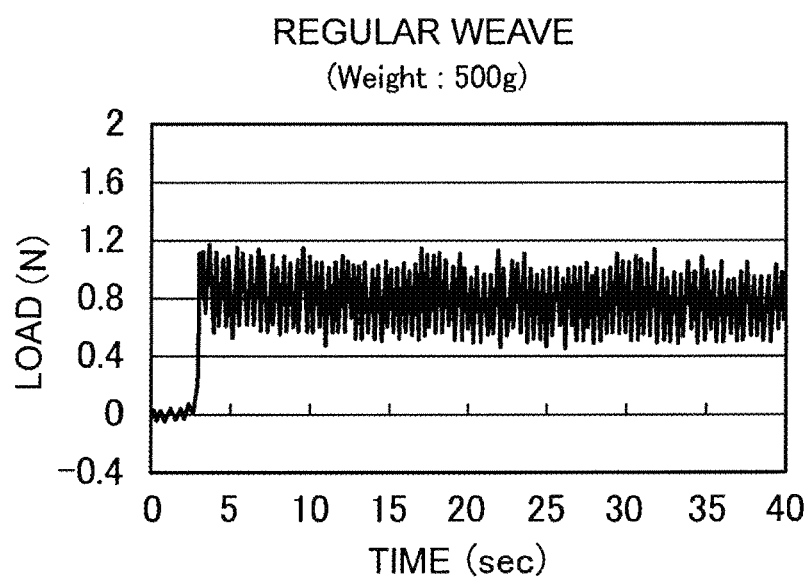
FIG. 15 is a graph showing the results of a friction test.

In the present invention, in particular, in the case where a webbing treatment agent, which will be described later, is applied, the weave is preferably a 2/2 derivative twill weave. The reason for this is that, as schematically shown in FIGS. 10 and 11, since the space between warp yarns 100 in a 2/2 derivative twill weave shown in FIG. 11 is large compared with a regular weave shown in FIG. 10, a webbing treatment agent 102 having a relatively low viscosity, which will be described later, easily infiltrates into the weave. Furthermore, in the 2/2 derivative twill weave, surface irregularities are larger than those of the regular weave, and the contact area with an anchor member 101 is small, resulting in low friction resistance.

A broken twill woven fabric is softer than a 2/2 derivative twill woven fabric. Therefore, the 2/2 derivative twill weave having higher rigidity than the broken twill weave is preferable as the webbing.

A webbing treatment agent suitable for being applied to the webbing base material will be described in detail below.

The viscosity at −30° C. of a hydrocarbon-based synthetic oil (hereinafter, may be referred to as hydrocarbon-based synthetic oil A), which is an essential component of the webbing treatment agent, is 35 to 100,000 mPa·s, preferably 100 to 50,000 mPa·s, more preferably 200 to 10,000 mPa·s, and particularly preferably 500 to 8,500 mPa·s. When the viscosity at −30° C. of the hydrocarbon-based synthetic oil A is 35 mPa·s or more, the oil film strength of the webbing treatment agent is sufficient and the smoothness tends to be improved. When the viscosity at −30° C. is 100,000 mPa·s or less, friction does not increase excessively, and smoothness and heat resistance at normal temperature and low temperature are excellent. The method of measuring the viscosity at −30° C. is as follows.

<Method of Measuring Viscosity at −30° C. of Hydrocarbon-Based Synthetic Oil A>

Into a cylindrical test tube made of glass with an inner diameter of about 22 mm and an overall length of about 115 mm, a measurement sample is fed to a position 30 mm lower than the top. Temperature control is performed for about 6 hours in a low-temperature thermostat bath "type BFV-L" (manufactured by Yoshida Kagaku Co., Ltd.) set at −30° C., and using a digital B-type viscometer "type DVL-B" (manufactured by Tokyo Keiki Inc.), the value of the viscometer after one minute is read. The Measurement was performed twice for the same sample, and the average thereof is defined as the viscosity at −30° C.

The hydrocarbon-based synthetic oil A may be a poly-α-olefin containing as an essential constitutional unit an α-olefin having 3 to 24 carbon atoms, or an ethylene/α-olefin copolymer containing as essential constitutional units ethylene and an α-olefin having 3 to 24 carbon atoms, although not limited thereto.

Specific examples of the α-olefin include propylene, 1-butene, 1-pentene, 1-hexene, 1-heptene, 1-octene, 1-nonene, 1-decene, 1-dodecene, 1-tetradecene, 1-hexadecene, 1-octadecene, 1-eicosene, 1-docosene, and 1-tetracosene. Among them, from the standpoint of smoothness and heat resistance at low temperature, an α-olefin having 6 to 18 carbon atoms is preferable, an α-olefin having 8 to 12 carbon atoms is more preferable, and 1-decene is particularly preferable.

Furthermore, as the constitutional monomer of the poly-α-olefin or the ethylene/α-olefin copolymer, one kind of α-olefin may be used alone, or two or more kinds of α-olefin may be used in combination.

Furthermore, the poly-α-olefin or the ethylene/α-olefin copolymer may contain as a constitutional unit a monomer other than ethylene and the α-olefin having 3 to 24 carbon atoms within the range that does not influence the advantageous effects of the present invention.

The method for producing the poly-α-olefin or the ethylene/α-olefin copolymer is not particularly limited. The poly-α-olefin or the ethylene/α-olefin copolymer can be produced by ordinary methods (e.g., Japanese Unexamined Patent Application Publication No. 1-163136 and Japanese Unexamined Patent Application Publication No. 61-221207). For example, in a production method, a catalyst (a radical catalyst, a metal oxide catalyst, a Ziegler catalyst, a Ziegler-Natta catalyst, or the like) and a monomer (ethylene and/or an α-olefin having 3 to 24 carbon atoms) are added to a hydrocarbon-based solvent (butane, pentane, hexane, cyclopentane, cyclohexane, xylene, toluene, or the like), polymerization is performed, then, as necessary, the remaining catalyst is removed, the product is subjected to fractional distillation, and hydrogenation is performed. The polymerization temperature is usually −50° C. to 150° C., and preferably −10° C. to 100° C. The pressure during the polymerization is usually 0.15 to 5 MPa. The polymerization time is usually one minute to 20 hours. The present description hereby incorporates by reference the entire contents of Japanese Unexamined Patent Application Publication No. 1-163136 and Japanese Unexamined Patent Application Publication No. 61-221207.

The webbing treatment agent may further contain a silicone oil (hereinafter, may be referred to as silicone oil B).

The viscosity at −30° C. of the silicone oil B is, from the standpoint of smoothness, preferably 35 to 45,000 mPa·s, more preferably 50 to 20,000 mPa·s, particularly preferably 80 to 10,000 mPa·s, and most preferably 150 to 8,000 mPa·s.

The weight ratio A/B of the hydrocarbon-based synthetic oil A to the silicone oil B is preferably 95/5 to 50/50, more preferably 90/10 to 60/40, and particularly preferably 85/15 to 70/30.

In other words, the content of the silicone oil B is preferably 5% to 50% by weight, more preferably 10% to 40% by weight, and particularly preferably 15% to 30% by weight, relative to the total weight of the hydrocarbon-based synthetic oil A and the silicone oil B. When the content of the silicone oil B is 5% by weight or more, smoothness at low temperature is satisfactory. When the content of the silicone oil B is 50% by weight or less, abrasion resistance is satisfactory.

Examples of the silicone oil B include polydimethylsiloxane, polymethylphenylsiloxane, an amino-modified silicone, a polyether-modified silicone, a carboxy-modified silicone, an alkyl-modified silicone, and a polyester-modified silicone. Among them, from the standpoint of smoothness at low temperature and high temperature, polydimethylsiloxane and an amino-modified silicone are preferable, and polydimethylsiloxane is more preferable.

Examples of the commercially available polydimethylsiloxane include "KF-96-350CS" (viscosity at −30° C.=1,200 mPa·s, manufactured by Shin-Etsu Chemical Co., Ltd.), "KF-96-1000CS" (viscosity at −30° C.=4,000 mPa·s, manufactured by Shin-Etsu Chemical Co., Ltd.), and "KF-96-10000CS" (viscosity at −30° C.=40,000 mPa·s, manufactured by Shin-Etsu Chemical Co., Ltd). Examples of the commercially available amino-modified silicone include "KF-865" (viscosity at −30° C.=350 mPa·s, manufactured by Shin-Etsu Chemical Co., Ltd).

The webbing treatment agent may further contain a nonionic surfactant (hereinafter, may be referred to as nonionic surfactant C).

Examples of the nonionic surfactant C include a polyhydric alcohol fatty acid ester, an alkylene oxide adduct of a polyhydric alcohol fatty acid ester (hereinafter, alkylene oxide is abbreviated as AO), an AO adduct of an aliphatic alcohol, a fatty acid alkanolamide, a polyoxyalkylenealkylphenyl ether, a polyoxyalkylene alkyl amine, and an alkyl amine oxide. Among them, from the standpoint of emulsifiability of the hydrocarbon-based synthetic oil A and the silicone oil B, a polyhydric alcohol fatty acid ester, an AO adduct of a polyhydric alcohol fatty acid ester, an AO adduct of an aliphatic alcohol, and a polyoxyalkylenealkylphenyl ether are preferable, and a polyhydric alcohol fatty acid ester and an AO adduct of a polyhydric alcohol fatty acid ester are more preferable.

Examples of the AO include ethylene oxide (hereinafter, may be abbreviated as EO), propylene oxide (hereinafter, may be abbreviated as PO), and butylene oxide. One kind of AO may be used or two or more kinds of AO may be used in combination. In the case where two or more kinds of AO are used in combination, either block addition (chip type, balance type, active secondary type, or the like) or random addition may be employed.

Specific examples of the polyhydric alcohol fatty acid ester include pentaerythritol monolaurate, pentaerythritol monooleate, sorbitan monolaurate, sorbitan monostearate, sorbitan dilaurate, sorbitan distearate, sorbitan dioleate, and sucrose monostearate.

Specific examples of the AO adduct of a polyhydric alcohol fatty acid ester include an ethylene oxide-propylene oxide random adduct of trimethylolpropane monostearate, an ethylene oxide adduct of sorbitan monolaurate, an ethylene oxide adduct of sorbitan monostearate, an ethylene oxide adduct of sorbitan distearate, and an ethylene oxide-propylene oxide random adduct of sorbitan dilaurate. The number of moles of added AO is preferably 1 to 60 moles, and more preferably 10 to 50 moles.

The weight ratio A/C of the hydrocarbon-based synthetic oil A to the nonionic surfactant C is, from the standpoint of emulsifiability, preferably 99/1 to 30/70, more preferably 80/20 to 35/65, and particularly preferably 60/40 to 40/60.

The webbing treatment agent may contain a component D other than the hydrocarbon-based synthetic oil A, the silicone oil B, and the nonionic surfactant C within the range that does not hinder the performance. Examples of the component D include a lubricating agent, an antistatic agent, an antioxidant, an ultraviolet absorber, and a pH adjuster.

Examples of the lubricating agent include an ester compound composed of an aliphatic (monohydric or polyhydric) alcohol and a monobasic acid (2-ethylhexyl stearate, trimethylolpropane trilaurate, or the like), a polyether polyester compound composed of a polyalkylene glycol, a monobasic acid, and a dibasic acid, and animal and vegetable oil (beef tallow, coconut oil, castor oil, or the like).

Examples of the antistatic agent include anionic surfactants (potassium lauryl phosphate, sodium lauryl sulfate, sodium oleate, sodium lauryl sulfosuccinate, and the like), cationic surfactants (lauryldimethylbenzyl ammonium chloride, benzalkonium chloride, and the like), and amphoteric surfactants (sodium laurylaminopropionate, lauryldimethylbetaine, 2-lauryl-N-carboxymethyl-N-hydroxyethyl imidazolynium betaine, and the like).

Examples of the antioxidant include hindered phenol antioxidants {triethylene glycol-bis[3-(3-tert-butyl-5-methyl-4-hydroxyphenyl)propionate], and the like}, and amine antioxidants [2,4-bis-(n-octylthio)-6-(4-hydroxy-3,5-di-tert-butylanilino)-1,3,5-triazine, and the like].

Examples of the ultraviolet absorber include benzotriazole-based ultraviolet absorbers [2-(3,5-di-tert-amyl-2-hydroxyphenyl)benzotriazole, and the like], and hindered amine ultraviolet absorbers [bis(2,2,6,6-tetramethyl-4-piperidyl)sebacate, and the like].

Examples of the pH adjuster include lower fatty acids (acetic acid, lactic acid, and the like), ammonia, and hydroxides of alkali metal (sodium hydroxide, potassium hydroxide, and the like).

The content of the component D is usually 0% to 30% by weight, preferably 0% to 20% by weight, and more preferably 0% to 15% by weight, based on 100% by weight of the solid content of the treatment agent. In the present invention, the term "solid content" refers to the content of components other than an aqueous medium, which will be described later.

The component D may be incorporated into the treatment agent as described above. Alternatively, as will be described later, in the treatment process, two or more baths may be prepared, and after treatment with the treatment agent containing the hydrocarbon-based synthetic oil A, retreatment may be performed in the bath containing the other component D.

The form of the webbing treatment agent may be either the treatment agent itself containing the hydrocarbon-based synthetic oil A, etc., or an aqueous dispersion further containing an aqueous medium. From the standpoint of workability, an aqueous dispersion is preferable.

In the case of an aqueous dispersion, as the aqueous medium, water, a hydrophilic organic medium, or a mixed medium of these may be used. Examples of the hydrophilic organic medium include alcohols (methanol, ethanol, isopropanol, and the like), ketones (acetone, methyl ethyl ketone, and the like), and carboxylate esters (ethyl acetate, and the like). In the case of a mixed medium, the percentage of water is preferably 80% by weight or more.

In the case where the treatment agent is composed of the hydrocarbon-based synthetic oil A, the silicone oil B, the nonionic surfactant C, and the other component D, for example, a production method is used in which the hydrocarbon-based synthetic oil A, the silicone oil B, the nonionic surfactant C, and the other component D are fed into a mixing tank equipped with a stirrer, and stirring is performed until achieving homogeneity.

In the case where the treatment agent is in the form of an aqueous dispersion containing the hydrocarbon-based synthetic oil A, the silicone oil B, the nonionic surfactant C, and the other component D, examples of the production method include the followings:

i) A method in which a mixture of A, B, C, and D is produced, and the mixture is dispersed in an aqueous medium.

ii) A method in which a mixture of A, C, and D and a mixture of B, C, and D are produced, and the two mixtures are dispersed in the same aqueous medium.

iii) A method in which, in the method ii) described above, the two mixtures are dispersed in different aqueous media to produce two aqueous dispersions, and then these are mixed together.

iv) A method in which a mixture of A, B, and D is produced, the mixture is dispersed in an aqueous medium to obtain an aqueous dispersion, and then C is added and dispersed therein.

v) A method in which a mixture of A, C, and D is produced, the mixture is dispersed in an aqueous medium to obtain an aqueous dispersion, and then B is added and dispersed therein.

In the production methods i) to v), the technique of emulsifying the aqueous dispersion is not particularly limited, but examples thereof include spontaneous emulsification, phase reversal emulsification, mechanically forced emulsification, high-pressure emulsification, a paste process, and simultaneous emulsification. Among them, from the standpoint of ease of production, spontaneous emulsification, phase reversal emulsification, and mechanically forced emulsification are preferable.

As a method of applying the webbing treatment agent to the webbing, for example, a method is suitable in which a seat belt webbing after having been dyed is treated by a padding process in a treating bath filled with a treatment agent in the form of an aqueous dispersion, although the method is not limited thereto. The concentration of the solid content in the treating bath is preferably 0.05% to 20% by weight, more preferably 0.1% to 10% by weight, and particularly preferably 0.5% to 8% by weight. After the seat belt webbing is treated with the webbing treatment agent, preferably, the seat belt webbing is subjected to a step of drying at 40° C. to 220° C., and more preferably, the seat belt webbing is dried at 80° C. to 170° C.

The amount of application of the treatment agent to the seat belt webbing treated with the treatment agent described above is not particularly limited, but is preferably 0.01% to 3% by weight, more preferably 0.05% to 2% by weight, and particularly preferably 0.1% to 1.5% by weight, relative to the weight of the seat belt webbing.

EXAMPLES

The present invention will be further described below with reference to examples. However, it is to be understood that the present invention is not limited thereto. Unless otherwise specified, "%" means "% by weight", and "part" means "part by weight".

The hydrocarbon-based synthetic oil A, the silicone oil B, the nonionic surfactant C, and the polyether-polyester compound used in Examples and Comparative Examples are as follows:

A-1: Poly-α-olefin "Lipolube 60" manufactured by Lion Corporation (viscosity at −30° C.=2,200 mPa·s)

A-2: Poly-α-olefin "Lipolube 80" manufactured by Lion Corporation (viscosity at −30° C.=4,900 mPa·s)
A-3: Ethylene/α-olefin copolymer "Lucant HC-10" manufactured by Mitsui Chemicals, Inc. (viscosity at −30° C.=10,000 mPa·s)
A-4: Ethylene/α-olefin copolymer "Lucant HC-20" manufactured by Mitsui Chemicals, Inc. (viscosity at −30° C.=62,000 mPa·s)
A-5: Ethylene/α-olefin copolymer "Lucant HC-100" manufactured by Mitsui Chemicals, Inc. (viscosity at −30° C.=1,400,000 mPa·s)
B-1: Polydimethylsiloxane "KF-96-350CS" manufactured by Shin-Etsu Chemical Co., Ltd. (viscosity at −30° C.=1,200 mPa·s)
B-2: Polydimethylsiloxane "KF-96-1000CS" manufactured by Shin-Etsu Chemical Co., Ltd. (viscosity at −30° C.=4,000 mPa·s)
B-3: Polydimethylsiloxane "KF-96-10000CS" manufactured by Shin-Etsu Chemical Co., Ltd. (viscosity at −30° C.=40,000 mPa·s)
B-4: Amino-modified silicone "KF-865" manufactured by Shin-Etsu Chemical Co., Ltd. (viscosity at −30° C.=350 mPa·s)
C-1: Glycerol monostearate "Glyran TG-C" manufactured by Sanyo Chemical Industries, Ltd.
C-2: Monooleate of sorbitan-EO (20 mol) adduct "Rheodol TW-O120V" manufactured by Kao Corporation
C-3: Lauryl alcohol-EO (10 mol) adduct "Emulmin NL-100" manufactured by Sanyo Chemical Industries, Ltd.
X-1: Polyether-polyester compound (solidifies at −30° C.) (produced in Production Example 1 described later)

Example 1

A webbing base fabric (dyed black) made of a 2/2 derivative twill weave of polyester yarns of 1,500 d, with a width of 47 mm and a thickness of 1.15 mm, was prepared. A webbing treatment agent having the composition shown in Table 1 was gradually added under stirring into water to thereby prepare an aqueous dispersion liquid (liquid containing a webbing treatment agent) with an effective component concentration of 2%. The webbing base fabric was subjected to immersion treatment in the aqueous dispersion liquid using a padding process, and then squeezed by a mangle at a squeeze rate of 50%. Next, drying was performed at 150° C. for 3 minutes, and thereby a treated webbing to which the treatment agent had been applied in an amount of 1% on the basis of solid content was produced.

The resulting webbing was fitted to a seat belt retractor and hung over an anchoring member as shown in FIG. 2, and a tongue was installed on the front end thereof.

Regarding the webbing, $W_{80}$, $W_{20}$, and $W_{-30}$ were measured in accordance with the method shown in FIG. 2, and $W_{20}/W_{-30}$ and $W_{20}/W_{80}$ were calculated. The results thereof are as shown in Table 1. The load initially applied to both ends was 110 g.

Examples 2 to 15

$W_{20}/W_{-30}$ and $W_{20}/W_{80}$ were calculated in the same manner except that the webbing treatment agents for Examples 2 to 15 shown in Tables 1 to 3 were used. The results thereof are as shown in Table 1.

Examples 16 to 27 in which Webbing of Regular Weave was Used $W_{20}/W_{-30}$ and $W_{20}/W_{80}$ were calculated in the same manner except that a regular woven fabric was used as the webbing base fabric in each of Examples 1 to 9 and 12 to 14. The results thereof are also shown in Tables 1 to 3.

Comparative Examples 1 to 3

$W_{20}/W_{-30}$ and $W_{20}/W_{80}$ were calculated as in Example 1 except that the webbing treatment agents for Comparative Examples 1 to 3 shown in Table 1 were used. The results thereof are as shown in Table 4.

Comparative Examples 4 and 5

The webbing treatment agents for Comparative Examples 2 and 3 shown in Table 4 were applied to webbing base fabrics of regular weave in the same manner to produce treated webbings, and $W_{20}/W_{-30}$ and $W_{20}/W_{80}$ were determined. The results thereof are shown in Table 4.

Production Example 1

Synthesis of Polyether-Polyester Compound

45 Parts of 1,4-butanediol and 369 parts of tetrahydrofuran (hereinafter abbreviated as THF) were placed in a pressure-tight reaction container equipped with a stirrer and a thermometer, 5 parts of boron trifluoride tetrahydrofuran complex as a catalyst was added thereto, and the container was nitrogen purged and hermetically sealed. 82.5 Parts of EO was added dropwise thereto at 40° C. over 2 hours to obtain 496 parts of a diol component, i.e., a random copolymer. Subsequently, 300 parts of the resulting diol component, 30.7 parts of adipic acid as a dibasic acid, and 168 parts of oleic acid as a monobasic acid were placed in a reaction container equipped with a stirrer, a thermometer, and a nitrogen-introducing tube, and 1.5 parts of para-toluenesulfonic acid as a catalyst was added thereto. Under nitrogen stream, reaction was performed at 150° C. for 12 hours to thereby obtain a polyether-polyester compound.

$W_{20}/W_{-30}$ and $W_{20}/W_{80}$ were evaluated on the basis of the evaluation criteria described below, and the evaluation results are shown in Tables 1 to 4.

| [Evaluation criteria for $W_{20}/W_{-30}$] | |
|---|---|
| -0.86 | Excellent |
| 0.85-0.81 | Good |
| 0.80-0.76 | Average |
| 0.75-0.71 | Passing |
| 0.70- | Failure |

| [Evaluation criteria for $W_{20}/W_{80}$] | |
|---|---|
| 1-0.98 | Excellent |
| 0.97-0.95 | good |
| 0.94-0.92 | Average |
| 0.91-0.89 | Passing |
| 0.88- | Failure |

TABLE 1

| | | Example 1, 16 | Example 2, 17 | Example 3, 18 | Example 4, 19 | Example 5, 20 |
|---|---|---|---|---|---|---|
| | A-1 | 55 | — | — | — | — |
| | A-2 | — | 60 | — | 45 | 45 |
| | A-3 | — | — | 60 | — | — |
| | A-4 | — | — | — | — | — |
| | A-5 | — | — | — | — | — |
| | B-1 | — | — | — | 13 | 15 |
| | B-2 | — | — | — | — | — |
| | B-3 | — | — | — | — | — |
| | B-4 | — | — | — | — | — |
| | C-1 | 25 | 20 | 13.33 | 15 | 20 |
| | C-2 | 20 | 20 | 13.33 | 27 | 20 |
| | C-3 | — | — | 13.33 | — | — |
| | X-1 | — | — | — | — | — |
| | A/B | 100/0 | 100/0 | 100/0 | 78/22 | 75/25 |
| | A/C | 55/45 | 60/40 | 60/40 | 52/48 | 53/47 |
| Examples 1 to 15 (2/2 Derivative twill) | Amount of weight applied at temperature of 20° C.: $W_{20}$ | 210 | 210 | 210 | 210 | 210 |
| | Amount of weight applied at temperature of −30° C.: $W_{-30}$ | 255 | 270 | 270 | 230 | 230 |
| | Amount of weight applied at temperature of 80° C.: $W_{80}$ | 210 | 210 | 210 | 210 | 210 |
| | $W_{20}/W_{-30}$ | 0.82 | 0.78 | 0.78 | 0.91 | 0.91 |
| | Low-temperature smoothness | Good | Good | Good | Excellent | Excellent |
| | $W_{20}/W_{80}$ | 1.00 | 1.00 | 1.00 | 1.00 | 1.00 |
| | High-temperature smoothness | Excellent | Excellent | Excellent | Excellent | Excellent |
| | Strength retention rate after hexagonal bar abrasion (%) | 95 | — | — | 94 | — |
| | Abrasion resistance | Excellent | — | — | Excellent | — |
| | Comprehensive evaluation | Good | Good | Good | Excellent | Excellent |

| | | Example 16 | Example 17 | Example 18 | Example 19 | Example 20 |
|---|---|---|---|---|---|---|
| Examples 16 to 20 (2/2 Regular) | Amount of weight applied at temperature of 20° C.: $W_{20}$ | 220 | 220 | 220 | 220 | 220 |
| | Amount of weight applied at temperature of −30° C.: $W_{-30}$ | 290 | 290 | 290 | 270 | 290 |
| | Amount of weight applied at temperature of 80° C.: $W_{80}$ | 230 | 220 | 220 | 225 | |
| | $W_{20}/W_{-30}$ | 0.76 | 0.76 | 0.76 | 0.81 | 0.76 |
| | | Average | Average | Average | Good | Average |
| | $W_{20}/W_{80}$ | 0.96 | 1.00 | 1.00 | 0.98 | |
| | | Good | Excellent | Excellent | Excellent | |
| | Comprehensive evaluation | Average | Average | Average | Good | Average |

TABLE 2

| | | Example 6, 21 | Example 7, 22 | Example 8, 23 | Example 9, 24 | Example 10 | Example 11 |
|---|---|---|---|---|---|---|---|
| | A-1 | — | — | — | — | 50 | — |
| | A-2 | — | — | — | 50 | — | 43 |
| | A-3 | 50 | 50 | — | — | — | — |
| | A-4 | — | — | 35 | — | — | — |
| | A-5 | — | — | — | — | — | — |
| | B-1 | 20 | 20 | 15 | — | — | — |
| | B-2 | — | — | — | 7 | — | — |
| | B-3 | — | — | — | — | 14 | — |
| | B-4 | — | — | — | — | — | 32 |
| | C-1 | 15 | 10 | 20 | 11 | — | 7 |
| | C-2 | 10 | 10 | 20 | 32 | 22 | 18 |
| | C-3 | 5 | 10 | 10 | — | 14 | — |
| | X-1 | — | — | — | — | — | — |
| | A/B | 71/29 | 71/29 | 70/30 | 88/12 | 78/22 | 57/43 |
| | A/C | 63/37 | 62.5/37.5 | 41/59 | 54/46 | 58/42 | 63/37 |
| Examples 6 to 11 (2/2 Derivative twill) | Amount of weight applied at temperature of 20° C.: $W_{20}$ | 210 | 210 | 220 | 210 | 210 | 210 |
| | Amount of weight applied at temperature of −30° C.: $W_{-30}$ | 245 | 230 | 260 | 250 | 260 | 245 |
| | Amount of weight applied at temperature of 80° C.: $W_{80}$ | 210 | 210 | 225 | 210 | 220 | 215 |
| | $W_{20}/W_{-30}$ | 0.86 | 0.91 | 0.85 | 0.84 | 0.81 | 0.86 |
| | Low-temperature smoothness | Excellent | Excellent | Good | Good | Good | Excellent |

TABLE 2-continued

|  |  |  |  |  |  |  |  |
|---|---|---|---|---|---|---|---|
|  | $W_{20}/W_{80}$ | 1.00 | 1.00 | 0.98 | 1.00 | 0.95 | 0.98 |
|  | High-temperature smoothness | Excellent | Excellent | Excellent | Excellent | Good | Excellent |
|  | Strength retention rate after hexagonal bar abrasion (%) | 93 | — | 95 | 94 | 93 | 91 |
|  | Abrasion resistance | Good | — | Excellent | Excellent | Good | Good |
|  | Comprehensive evaluation | Good | Excellent | Good | Good | Good | Good |

|  |  | Example 21 | Example 22 | Example 23 | Example 24 |  |  |
|---|---|---|---|---|---|---|---|
| Examples 21 to 24 (2/2 Regular) | Amount of weight applied at temperature of 20° C.: $W_{20}$ | 220 | 220 | 220 | 220 | — | — |
|  | Amount of weight applied at temperature of −30° C.: $W_{-30}$ | 280 | 290 | 285 | 275 | — | — |
|  | Amount of weight applied at temperature of 80° C.: $W_{80}$ | 225 | 220 | 225 | 225 | — | — |
|  | $W_{20}/W_{-30}$ | 0.79 Average | 0.76 Average | 0.77 Average | 0.80 Average | — | — |
|  | $W_{20}/W_{80}$ | 0.98 Excellent | 1.00 | 0.98 Excellent | 0.98 Excellent | — | — |
|  | Comprehensive evaluation | Average | Average | Average | Average | — | — |

TABLE 3

|  |  | Example 12, 25 | Example 13, 26 | Example 14, 27 | Example 15 |
|---|---|---|---|---|---|
|  | A-1 | — | — | 30 | 55 |
|  | A-2 | 55 | 29 |  |  |
|  | A-3 | — | — | — | — |
|  | A-4 | — | — | — | — |
|  | A-5 | — | — | — | — |
|  | B-1 | 3 | 29 | — | — |
|  | B-2 | — | — | — | — |
|  | B-3 | — | — | — | — |
|  | B-4 | — | — | — | — |
|  | C-1 | 15 | 15 | 39 | 25 |
|  | C-2 | 27 | 27 | 31 | 20 |
|  | C-3 |  |  |  |  |
|  | X-1 | — | — | — | — |
|  | A/B | 95/5 | 50/50 | 100/0 | 100/0 |
|  | A/C | 57/43 | 41/69 | 30/70 | 55/45 |
| Examples 12 to 15 (2/2 Derivative twill) | Amount of weight applied at temperature of 20° C.: $W_{20}$ | 210 | 210 | 220 | 210 |
|  | Amount of weight applied at temperature of −30° C.: $W_{-30}$ | 260 | 235 | 270 | 250 |
|  | Amount of weight applied at temperature of 80° C.: $W_{80}$ | 210 | 210 | 230 | 210 |
|  | $W_{20}/W_{-30}$ | 0.81 | 0.89 | 0.81 | 0.84 |
|  | Low-temperature smoothness | Good | Excellent | Good | Good |
|  | $W_{20}/W_{80}$ | 1.00 | 1.00 | 0.96 | 1.00 |
|  | High-temperature smoothness | Excellent | Excellent | Good | Excellent |
|  | Strength retention rate after hexagonal bar abrasion (%) | 95 | 92 | 94 | 93 |
|  | Abrasion resistance | Excellent | Good | Excellent | Good |
|  | Comprehensive evaluation | Good | Good | Good | Good |

|  |  | Example 25 | Example 26 | Example 27 |  |
|---|---|---|---|---|---|
| Examples 25 to 27 (2/2 Regular) | Amount of weight applied at temperature of 20° C.: $W_{20}$ | 220 | 210 | 220 | — |
|  | Amount of weight applied at temperature of −30° C.: $W_{-30}$ | 285 | 260 | 290 | — |
|  | Amount of weight applied at temperature of 80° C.: $W_{80}$ | 225 | 215 | 230 | — |
|  | $W_{20}/W_{-30}$ | 0.77 Average | 0.81 Good | 0.76 Average | — |
|  | $W_{20}/W_{80}$ | 0.98 Excellent | 0.98 Excellent | 0.96 Good | — |
|  | Comprehensive evaluation | Average | Good | Average | — |

TABLE 4

|  | Comparative Example 1 | Comparative Example 2, 4 | Comparative Example 3, 3 |
|---|---|---|---|
| A-1 | — | — | — |
| A-2 | — | — | — |
| A-3 | — | — | — |

TABLE 4-continued

|  |  | Comparative Examples 1 to 3 (2/2 Derivative twill) | | |
|---|---|---|---|---|
|  | A-4 | — | — | — |
|  | A-5 | 35 | — | — |
|  | B-1 | 15 | 40 | — |
|  | B-2 | — | — | — |
|  | B-3 | — | — | — |
|  | B-4 | — | — | — |
|  | C-1 | 20 | 2.5 | 2.5 |
|  | C-2 | 20 | 2.5 | 2.5 |
|  | C-3 | 10 | — | — |
|  | X-1 | — | 55 | 95 |
|  | A/B | 70/30 | — | — |
|  | A/C | 41/59 | — | — |
| Comparative Examples 1 to 3 (2/2 Derivative twill) | Amount of weight applied at temperature of 20° C.: $W_{20}$ | 210 | 210 | 220 |
|  | Amount of weight applied at temperature of –30° C.: $W_{-30}$ | 295 | 270 | 300 |
|  | Amount of weight applied at temperature of 80° C.: $W_{80}$ | 225 | 215 | 230 |
|  | $W_{20}/W_{-30}$ | 0.71 | 0.78 | 0.73 |
|  | Low-temperature smoothness | Passing | Average | Passing |
|  | $W_{20}/W_{80}$ | 0.93 | 0.98 | 0.96 |
|  | High-temperature smoothness | Average | Good | Good |
|  | Strength retention rate after hexagonal bar abrasion (%) | 92 | 90 | 90 |
|  | Abrasion resistance | Good | Average | Average |
|  | Comprehensive evaluation | Passing | Average | Passing |

|  |  | Comparative Example 4 | Comparative Example 5 |
|---|---|---|---|
| Comparative Examples 4 and 5 (2/2 Regular) | Amount of weight applied at temperature of 20° C.: $W_{20}$ | — | 220 | 220 |
|  | Amount of weight applied at temperature of –30° C.: $W_{-30}$ | — | 300 | 340 |
|  | Amount of weight applied at temperature of 80° C.: $W_{80}$ | — | 230 | 240 |
|  | $W_{20}/W_{-30}$ | — | 0.73 | 0.65 |
|  |  | — | Passing | Failure |
|  | $W_{20}/W_{80}$ | — | 0.96 | 0.92 |
|  |  | — | Good | Average |
|  | Comprehensive evaluation | — | Passing | Failure |

Regarding the seat belt webbings treated with the treatment agents in Examples 1 to 27 and Comparative Examples 1 to 5, abrasion resistance was measured by the method described below.

<Evaluation Method of Abrasion Resistance>

A treated seat belt webbing (length: 1.5 m) is moved reciprocally over a hexagonal bar (according to JIS G 4604) serving as an abrasive, 2,500 times, under a load of 500 g, to wear the surface of the webbing. The tensile strength was measured before and after abrasion by the method described in JIS-G4604, and the strength retention rate (%) after abrasion was calculated. The larger value indicates better durability after use for a long period of time and higher abrasion resistance. Furthermore, from the strength retention rate (%) after abrasion, abrasion resistance was evaluated on the basis of the criteria described below. The results are shown in Tables 3 and 4.

[Evaluation Criteria]

| | |
|---|---|
| Strength retention rate after abrasion of 94% or more | Excellent |
| Strength retention rate after abrasion of 91% or more and less than 94% | Good |
| Strength retention rate after abrasion of 88% or more and less than 91% | Average |
| Strength retention rate after abrasion of 85% or more and less than 88% | Passing |
| Strength retention rate after abrasion of less than 85% | Failure |

As is evident from Examples and Comparative Examples described above, the seat belt devices of the present invention have good webbing retracting performance even in an extremely cold region, and among them, Examples 1 to 4 and 7 and 8 in which the webbing base fabric is made of a 2/2 derivative twill weave have particularly good webbing retracting performance. In particular, in Examples 1 and 7, the composition of the treatment agent is suitable, the coefficient of friction is low as shown in the friction test described below, and the webbing made of the 2/2 derivative twill weave to which the treatment agent is easily applied is used. Therefore, the best results are obtained.

Furthermore, as is evident from Tables 3 and 4, the seat belt webbings of the present invention excel in smoothness, abrasion resistance, and heat resistance at normal temperature and a low temperature (–30° C.)

[Reference Evaluation Test]

The friction resistance of a 2/2 derivative twill weave webbing used in Example 1 and a regular weave webbing (before attaching the agent) was measured in accordance with JIS K 7125 (1999), using a weight of 200 g or 500 g. Note that JIS K 7125 (1999) corresponds to ASTM 1894.

The test table in the friction test is a chromium-plated steel plate. The measurement results of the coefficient of static friction and the coefficient of dynamic friction are shown in Table 5 and FIGS. 12 to 15. As shown in Table 5, the 2/2 derivative twill weave has lower values in the coefficient of static friction and the coefficient of dynamic friction than the regular weave.

TABLE 5

| | Coefficient of static friction (µs) | | Coefficient of dynamic friction (µd) | |
|---|---|---|---|---|
| Weight | 200 g | 500 g | 200 g | 500 g |
| 2/2 Derivative twill Average | 0.25 | 0.23 | 0.15 | 0.14 |
| Regular Average | 0.31 | 0.27 | 0.19 | 0.17 |

| Reference Signs List | |
|---|---|
| 10 | test bar |
| 11 | retractor |
| 12 | webbing |
| 13 | shoulder anchor |
| 14 | anchor |
| 15 | tongue |

The invention claimed is:

1. A seat belt device comprising:
a webbing formed by applying a webbing treatment agent to a webbing base material;
a retractor for retracting the webbing; and
an anchor member through which the webbing is slidably hung,
wherein the webbing treatment agent is characterized by containing as an essential component a hydrocarbon-based synthetic oil with a viscosity of 35 to 100,000 mPa·s at 30°; wherein the webbing base material is made of a 2/2 derivative twill woven fabric of synthetic fibers, and wherein the treatment agent is retained between at least two adjacent yarns that do not abut each other.

2. The seat belt device according to claim 1, wherein the hydrocarbon-based synthetic oil comprises a poly-α-olefin containing as an essential constitutional unit an α-olefin having 3 to 24 carbon atoms or an ethylene/α-olefin copolymer containing as essential constitutional units ethylene and an α-olefin having 3 to 24 carbon atoms.

3. The seat belt device according to claim 1, wherein the webbing treatment agent further contains a silicone oil with a viscosity of 35 to 45,000 mPa·s at −30° C., and wherein a weight ratio of the hydrocarbon-based synthetic oil/the silicone oil is 95/5 to 50/50.

4. The seat belt device according to claim 3, wherein the silicone oil comprises at least one of polydimethylsiloxane and an amino-modified silicone.

5. The seat belt device according to claim 1, wherein the webbing treatment agent further contains a nonionic surfactant, and wherein a weight ratio of the hydrocarbon-based synthetic oil/the nonionic surfactant is 99/1 to 30/70.

6. The seat belt device according to claim 5, wherein the nonionic surfactant comprises a polyhydric alcohol fatty acid ester, an alkylene oxide adduct of a polyhydric alcohol fatty acid ester, or a combination thereof.

7. The seat belt device according to claim 1, wherein the webbing base material is made of a 2/2 derivative twill woven fabric of synthetic fibers.

8. The seat belt device according to claim 1, wherein the webbing base material is made of a regular woven fabric of synthetic fibers or broken twill woven fabric of synthetic fibers.

9. The seat belt device according to claim 1, wherein, when a test is carried out at +20° C. and −30° C., in which the webbing is hung over a horizontal test bar so that both ends of the webbing are suspended vertically downward, an equal load is applied to the both ends, then the load on one of the ends is increased, and the amount of load W at which the webbing starts to move is measured, $W_{20}/W_{-30}$ is 0.75 or more, where $W_{20}$ is the load W at +20° C., and $W_{-30}$ is the load W at −30° C.

10. The seat belt device according to claim 1, wherein the hydrocarbon-based synthetic oil makes up 23% to 99% by a total weight of the webbing treatment agent.

* * * * *